(12) United States Patent
Aggstaller et al.

(10) Patent No.: US 10,584,628 B2
(45) Date of Patent: Mar. 10, 2020

(54) METHOD FOR OPERATING A FLUID CIRCUIT OF A MOTOR VEHICLE, AND CORRESPONDING FLUID CIRCUIT

(71) Applicant: AUDI AG, Ingolstadt (DE)

(72) Inventors: Josef Aggstaller, Train (DE); Dietmar Schuller, Altmannstein (DE); Stefan Ammler, Bergheim (DE)

(73) Assignee: AUDI AG, Ingolstadt (DE)

( * ) Notice: Subject to any disclaimer, the term of this patent is extended or adjusted under 35 U.S.C. 154(b) by 481 days.

(21) Appl. No.: 15/501,941

(22) PCT Filed: Aug. 5, 2015

(86) PCT No.: PCT/EP2015/001614
§ 371 (c)(1),
(2) Date: Feb. 6, 2017

(87) PCT Pub. No.: WO2016/023625
PCT Pub. Date: Feb. 18, 2016

(65) Prior Publication Data
US 2017/0226921 A1 Aug. 10, 2017

(30) Foreign Application Priority Data
Aug. 13, 2014 (DE) .......... 10 2014 012 027

(51) Int. Cl.
*F01P 11/16* (2006.01)
*F01P 11/18* (2006.01)
(Continued)

(52) U.S. Cl.
CPC ............... *F01P 11/16* (2013.01); *F01P 3/20* (2013.01); *F01P 5/10* (2013.01); *F01P 7/16* (2013.01);
(Continued)

(58) Field of Classification Search
CPC ...... F01P 11/16; F01P 5/10; F01P 7/16; F01P 3/20; F01P 11/18; F01P 2025/08;
(Continued)

(56) References Cited

U.S. PATENT DOCUMENTS 6,321,696 B1 11/2001 Nishioka et al.
2004/0141849 A1* 7/2004 Deneir ............... F04B 49/08
417/32

(Continued)

FOREIGN PATENT DOCUMENTS

CN 102076937 A 5/2011
CN 102695857 A 9/2012
(Continued)

OTHER PUBLICATIONS

German Office Action dated Apr. 15, 2015 of corresponding application No. 10 2014 012 027.9; 5 pgs.
(Continued)

*Primary Examiner* — Natalie Huls
*Assistant Examiner* — Janice M Soto
(74) *Attorney, Agent, or Firm* — Maier & Maier, PLLC (57) ABSTRACT

A method for operating a fluid circuit of a motor vehicle, used for operating via a main circuit, and with a secondary circuit that is connected through a mechanical thermostatic valve to the main circuit, and an electric fluid conveying device for conveying a fluid. In a test mode, during a test period, the fluid conveying device is adjusted to a test operational speed and the actual amperage of the current required for the fluid conveying device is determined, wherein with an actual temperature of the fluid, which is lower than a switching temperature of the thermostatic value, the actual current amperage is stored as the first amperage value, and with an actual temperature, which is higher than the switching temperature, a second amperage
(Continued)

value is stored, so that a proper function of the thermostatic valve is recognized when the second amperage is higher than the first amperage value.

10 Claims, 3 Drawing Sheets

(51) Int. Cl.
| | | |
|---|---|---|
| *F01P 3/20* | (2006.01) | |
| *F01P 5/10* | (2006.01) | |
| *F01P 7/16* | (2006.01) | |
| *F16K 37/00* | (2006.01) | |
| *F01P 5/12* | (2006.01) | |
| *F01P 7/14* | (2006.01) | |
| *F16H 57/04* | (2010.01) | |
| *F16H 59/72* | (2006.01) | |
| *F16H 61/00* | (2006.01) | |

(52) U.S. Cl.
CPC .......... *F01P 11/18* (2013.01); *F16K 37/0091* (2013.01); *F01P 2005/125* (2013.01); *F01P 2007/146* (2013.01); *F01P 2025/08* (2013.01); *F16H 57/0446* (2013.01); *F16H 59/72* (2013.01); *F16H 61/0021* (2013.01); *F16H 2061/0037* (2013.01)

(58) Field of Classification Search
CPC ........... F01P 2007/146; F01P 2005/125; F16K 37/0091; F16H 59/72; F16H 61/0021; F16H 2061/0037; F16H 57/0446
See application file for complete search history.

(56) References Cited

U.S. PATENT DOCUMENTS

| | | |
|---|---|---|
| 2011/0048390 A1 | 3/2011 | Washburn |
| 2011/0120216 A1 | 5/2011 | Sugimoto |

FOREIGN PATENT DOCUMENTS

| | | | |
|---|---|---|---|
| DE | 19958385 A1 | | 6/2001 |
| DE | 10161867 A1 | | 10/2003 |
| DE | 102008000138 A1 | | 10/2008 |
| DE | 102008032130 A1 | | 1/2010 |
| DE | 102012204492 A1 | | 9/2013 |
| JP | 2013194716 A | * | 9/2013 |

OTHER PUBLICATIONS

International Search Report dated Nov. 4, 2015 of corresponding application No. PCT/EP2015/001614; 7 pgs.
Chinese Office Action dated Jun. 25, 2018, in connection with corresponding CN Application No. 201580042826.7 (13 pgs., including English translation).
Transmittal of Translation of the International Preliminary Report on Patentability dated Feb. 23, 2017, in connection with corresponding International Application No. PCT/EP2015/001614 filed Aug. 5, 2015 (6 pgs.).

* cited by examiner

METHOD FOR OPERATING A FLUID CIRCUIT OF A MOTOR VEHICLE, AND CORRESPONDING FLUID CIRCUIT

BACKGROUND

The invention relates to a method for operating a fluid circuit of a motor vehicle, which is equipped with a main circuit that is connected to a secondary circuit through a mechanical thermostatic valve, as well as with an electric fluid conveying device for conveying a fluid. The invention further also relates to a fluid circuit for a motor vehicle.

The fluid circuit can be in principle any circuit of the motor vehicle in which a fluid is present. The fluid can be for example a hydraulic fluid, a coolant or the like, so that the fluid circuit is in this respect designed as a hydraulic circuit or as a cooling circuit. The fluid circuit is provided in the embodiment described here with a main circuit, which is associated with an electric fluid conveying device. The latter is used for delivering the fluid at least through the main circuit.

In addition, the secondary circuit is associated with the secondary circuit. The secondary circuit is connected via the mechanical thermostatic valve to the main circuit. The thermostatic valve is preferably designed in such a way that at an actual temperature of the fluid that is lower than the switching temperature of the thermostatic valve, the secondary circuit is fluidically decoupled from the main circuit, so that the fluid conveyed by fluid conveying device into the main circuit cannot pass into the secondary circuit. The thermostatic valve is thus in this case in a first switching state.

However, if the actual temperature of the fluid reaches or exceeds the switching temperature, the thermostatic valve will fluidically connect the secondary circuit to the main circuit, so that the fluid that has been conveyed by the fluid conveying device flows also through the secondary circuit. The thermostatic valve is thus in this case in a second switching state.

The thermostatic valve preferably operates fully mechanically, which means that it is not equipped with an electric actuator for switching between the switching states. Accordingly, no diagnostic capability is provided for the thermostatic valve.

SUMMARY OF THE DISCLOSURE

It is an object of the present invention to provide a method for operating a fluid circuit of a motor vehicle, which has advantages over prior art, and in particular enables a simple and reliable diagnosis of the thermostatic valve.

This is achieved in accordance with the invention with a method that has the features of claim 1. According to this method, the fluid conveying device is set to a certain rotational speed during the testing time period in a testing operation mode and the actual amperage of the current required for the fluid conveying device is determined, so that at the actual temperature of the fluid that is lower than a switching temperature of the thermostatic valve, the actual amperage is stored as the first amperage value, and at an actual temperature that is higher than the switching temperature, a second amperage value is stored, wherein a proper function of the thermostatic valve is recognized when the second amperage value is higher than the first amperage value.

The function of the method according to the invention is based primarily on the fact that flow resistance of the fluid is greater when the secondary circuit is fluidly coupled with the main circuit. As long as the thermostatic valve is present in its first switching state and the fluid conveying device circulates the fluid only in the main circuit, a first flow resistance is present. If the thermostatic valve is in its second switching state, the fluidic connection between the main circuit and the secondary circuit is open, which means that the fluid conveying device will be conveying the fluid from that point on not only through the main circuit, but additionally also through the secondary circuit. In that regard, a second flow resistance is therefore present, which exceeds the first flow resistance.

This, however, means that the electric current requirements of the fluid conveying device are higher, so that the actual amperage when the second switching state of the thermostatic valve is present is higher than when the first switching state is present. In that respect, at least two amperage values must be detected and then applied to the diagnosis of the thermostatic valve.

Instead of the first amperage value and the second amperage value, it is also possible to detect a first pair of values and a second pair of values. The first pair of values includes the actual amperage that is present when the actual temperature of the fluid is lower than the switching temperature of the thermostatic valve, which is to say the first amperage value. Additionally, however, the actual temperature is also stored in the first pair of values. Accordingly, the actual temperature will correspond to the second amperage value in which the second pair of values is stored when the actual temperature of the fluid is higher than or equal to the switching temperature. The actual temperature is stored additionally also in this case. If both value pairs are present, all actual amperages that have been stored can be mutually compared.

In particular, it is ascertained whether the actual amperage of the second value pair is greater than that of the first value pair. If this is the case, a proper function of the thermostatic valve is recognized. Conversely, a defect is recognized when the amperage of the second value pair is lower than or equal to the actual amperage of the first value pair.

The thermostatic valve operates, as was already mentioned, mechanically. For example, it is in this respect provided with a mechanical actuator, which selectively sets the first switching state or the second switching state depending on the actual temperature of the fluid of the thermostatic valve. In the first switching state, the secondary circuit is completely decoupled from the main circuit. In the second switching state, the thermostatic valve releases the fluidic connection between the main circuit and the secondary circuit at least regionally, in particular completely. It goes without saying that other switching states may also exist in which the flow connection is released further than in the first switching state, but less than in the second switching state.

According to another embodiment of the invention, the fluid conveying device is adapted for a certain time period before the rotational speed for testing is set. In this manner it is ensured that the fluid conveying device will be operated with the rotational for testing speed already at the beginning of the testing time period. The time period is therefore selected in such a way that the fluid conveying device will have sufficient time to speed up, or to slow down from the rotational speed that is momentarily present, to the rotational speed for testing.

Additionally or alternatively, it may be also provided that the rotational speed for testing is reduced when a certain time period has expired after the testing time period, in particular so that it is set to zero. All that is needed is that the test rotational speed must be present during the test time period. When this period is over, rotational speed can be selected essentially at will. In order to achieve energy savings, it should be reduced, preferably so that it is set to zero.

For example, the target rotational speed of the fluid conveying device is determined from a required rotational speed and from the test rotational speed, wherein the target rotational speed is set to be the same or higher of both speeds. The target rotational speed is then adjusted on the fluid conveying device, so that ideally, the actual rotation speed matches the target rotational speed. For example, the fluid conveying device is accordingly controlled for this purpose in such a way that the actual rotation speed of the fluid conveying device is controlled at the target rotational speed. The required rotational speed can be then determined for example from an operational state of the fluid circuit and/or of the motor vehicle. The required rotational speed can be determined for example from a preset pressure, which should be present in the fluid circuit, if the circuit is designed as a hydraulic circuit.

In a further development of the invention, when the actual amperage falls below a local minimum amperage during the test time period, the local minimum amperage is set to the actual amperage and the actual temperature of the fluid is stored along with the amperage as the first test time period value pair, and when the actual amperage exceeds a local maximum amperage during the testing time period, the local maximum amperage is set to the actual amperage and the actual temperature of the fluid as well as the actual amperage are stored as the second test time period value pair. At the beginning of the test time period, the local minimum amperage and the local maximum amperage are reset, for example by setting the local minimum amperage to a very high value and the local maximum amperage to a very low value, for example zero. As an alternative, it is also possible to set both the local minimum amperage as well as the local maximum amperage to the amperage that was present at the beginning of the test time period.

If the actual amperage during the tests time falls below the local minimum amperage, than this amperage should be kept fixed in the first test time period value pair. In addition, this should be done also for the actual temperature present at the point in time when the actual amperage is below the local minimum amperage. In summary, the local minimum amperage tracks the actual amperage as soon as the local minimum amperage falls below its value. The local minimum amperage therefore quantifies the smallest actual amperage which is present during the entire test time period.

The same is applicable also to the local maximum amperage. If the actual amperage during the test time period is above the local maximum amperage, then it will be set to the actual amperage. At the same time, the actual temperature of the fluid as well as the momentarily present actual amperage are stored in the form of the second test time period value pair. Also the local maximum amperage is tracked so that the local maximum amperage quantifies the highest actual amperage present during the test time period.

According to a preferred embodiment of the invention, the test time period is ended prematurely when one or several of the following conditions are present:

A required rotational speed is different from the test rotational speed; and/or the actual amperage exceeds an amperage threshold value; and or an actual rotational speed of the fluid conveying device deviates by at least a certain differential speed from test rotational speed; and/or a fluctuation of the actual rotational speed is determined; and/or the difference of the local maximum amperage and local minimum amperage exceeds a difference threshold value; and/or a change of the actual temperature is detected; and/or a driving speed of the motor vehicle is below a threshold value for driving speed.

In summary, the testing should be canceled or the test time period should be ended prematurely when certain boundary conditions are no longer present for the testing. At the same time, it is preferably sufficient when a single of the conditions listed above is satisfied. Under the term required rotational speed should be in particular understood a rotational speed that is determined by a control device for the fluid circuit or for an internal combustion engine of the motor vehicle. The duration of the test time period is preferably selected in such a way that it can be assumed on the basis thereof that the actual temperature of the fluid remains constant. However, should a change of the actual temperature occur, a premature ending is assumed for the test time period.

According to another embodiment of the invention, several test time periods are introduced during the entire test time period, so that at the end of the first test time period, a starting value pair is set that is equal to the first test time period pair. All the test time periods are run in the test mode. Several test time periods are thus realized one after another, wherein the operations are carried out in each of the test time periods according to the embodiments mentioned above.

The test time periods can chronologically follow directly one after another, or they can be spaced apart from each other, for example by using a constant interval. The test time periods can of course follow each other also at irregular intervals. Under the term the first test time period is usually understood a test mode or a test time period that is introduced as the first one during the entire test time period. In particular, the first test time period is the test time period after turning on the ignition of the motor vehicle, in particular a completely carried out test time period. At the end of the test time period, the start value pair is defined and simultaneously set as being equal to the test time value pair, which is stored for the smallest actual value during the test time period, however, preferably only when the test time period has been carried out completely, which is to say when it was not ended prematurely.

According to another development of the invention, when one of the amperages stored in a first global value pair falls below the amperage of global value pair after the test time period, a stored first global value pair that is equal to the first test time period value pair is set, and/or when the amperage stored in a second global value pair exceeds one of the amperages stored in a second global value pair after the test time period, a second global value pair that is equal to first test time value pair is set. However, this is preferably done only when the test time period has been fully completed, which is to say that it was not ended prematurely.

The first global value pair and/or the second global value pair are determined as long as a test time period has been fully completed. In the first global value pair should be present the lowest actual amperage, seen globally, and in the second global value pair should be present the highest actual amperage, seen globally, while the test mode or the total test time period is present. Accordingly, the procedure described above is carried out, in particular after each of the multiple test time periods, preferably immediately after each of the multiple test time periods. If the amperage stored in the first global value pair is below the amperage stored in the first test time period value pair, then the first global value pair should be set equal to the first test time period value pair.

This means that both the amperage of the first global value pair is set equal to the amperage of the first test time period value pair, and also the temperature of the first global value pair is set to the temperature of the test time period value pair. Accordingly, during the second global value pair procedure, after the test time period, in particular immediately after the test time period, the amperage of the second global value pair will exceed the amperage of the first test time period value pair. It goes without saying that it is preferred when the first global value pair and the second global value pair is initialized at the beginning of the test mode or of the total test time period. Reference is in this context made to the embodiment provided in connection with the local minimum amperage and the local maximum amperage.

Additionally or alternatively, when the temperature of the second global value pair is exceeded by the temperature of the first global value pair, the second global value pair is set equal to the first global value pair. Normally, the temperature of the first global value pair is set lower than that of the second global value pair. However, the case described above can occur under certain operating conditions. Nevertheless, in order to enable an evaluation, the second global value pair should track the first global value pair or be set equal to it. In particular, both the temperature and the amperage of the second global value pair are set to the value of the first global value pair. This is carried out for example immediately after the test time period or the above-described setting of the first global value pair and/or of the second global value pair to the first test time period value pair.

In that regard, the actual amperages or actual temperatures that are stored in the corresponding value pairs are referred to in the context of this description of the amperage of a value pair, in particular of a test time value pair or a global value pair, or of the temperature of a value pair.

According to another embodiment of the invention, an evaluation is initiated after the test time period when one or several of the following conditions apply:

The amperage of the second global value pair is higher by a certain first amperage difference than that amperage of the first global value pair; and/or the amperage of the first test time period value pair is lower by a certain second amperage difference than the amperage of the second global value pair; and or the actual temperature of the fluid is higher than the temperature of the second global value pair; and/or the temperature of the second global value pair is higher than the temperature of the first global value pair.

The evaluation is preferably performed only when the test time period has been completely realized, which is to say when it was not ended prematurely. It can be sufficient when only one of the conditions applies. Preferably, however, several of the conditions must be met, preferably all of them. The first amperage difference and/or the second amperage difference are determined from empirical values. This is carried out in particular in such a way that the amperage and the temperature of the fluid can reliably determined from the recorded values, which makes it possible to determine whether the thermostatic value is functional or whether it has a defect. The first amperage difference and the second amperage difference can be also set so that they equal zero.

Within the context of a further development of the invention, it is also possible that at the beginning of the evaluation, an evaluation value pair is set that equals the first test time value pair of the immediately preceding test time period. This is especially the case when several test time periods have been completed before the evaluation was initiated. The amperage and the temperature of the first test time period value pair, which were determined in the test time period directly preceding the evaluation, are retained in the form of an evaluation value pair. This is preferably carried out only when the test time period has been fully completed, which is to say when it was not ended prematurely.

According to another embodiment of the invention, a test signal is generated when one or several of the following conditions apply:

$t_s \leq t_1 \leq t_2 \leq t_A$, wherein $t_s$ is the temperature of the starting value pair, $t_1$ is the temperature of the first test time period value pair, $t_2$ is the temperature of the second test time period value pair, and $t_A$ is the temperature of the evaluation time period value pair; and/or the difference between the amperage of the second global value pair and the amperage of the first global value pair is greater than a certain global amperage difference; and the difference between the temperature of the second global value pair and the temperature of the first global value pair is smaller than a certain global temperature difference; and/or the difference between the amperage of the starting value pair and the amperage of the first global value pair is smaller than a certain starting amperage difference.

It can be sufficient when only one of these conditions is sufficient to generate the test signal. Preferably, however, several of the conditions must apply to cause the signal to be generated, in particular all of the conditions. The first condition is a rising temperature range, wherein the temperatures of the starting value pair, of the global value pair, and of the second global value pair as well as of the evaluation value pair must be rising in the named sequence or at least remain equal.

The global amperage difference, which must be between the amperage of the second global value pair and that of the first global value pair in order to generate the test signal, should be selected in such a way that the evaluation is meaningful. If the global amperage difference selected is too small, erroneous detection of a proper function or of a defect can occur during the diagnosis. Conversely, the difference between the temperatures of the second global value pair and the first value pair may not be too high. Therefore, the global temperature difference, which must be below the difference indicated for generating the test signal, must be selected accordingly.

Additionally and/or alternatively, the difference between the amperages of the starting value pair and the first global value pair must be smaller than the starting amperage difference. The starting amperage difference is also selected in such a way that that a reliable recognition of the functionality or of a defect of thermostatic valve is possible. It goes without saying that at least one of said differences, in particular several or all of said difference, can be also selected as zero.

According to a further development of the invention, the proper function of the thermostatic valve is recognized when the test signal is generated. In such a variant, it is then sufficient already when the test signal is present to distinguish between functionality and a defect of the thermostatic valve. Reference will be made below to a further embodiment.

According to another development of the invention, the starting amperage difference is determined from a specific scaling factor and a difference between the temperature of the starting value pair and the temperature of the first global value pair. The starting amperage difference therefore results from the multiplication of the scaling factor by that difference. The scaling factor is in this case expressed in a corresponding unit, namely as amperage over temperature, in particular as A/° C., or as A/K.

It can be also provided according to another embodiment of the invention that a total temperature gradient over time is determined from the actual temperature at the beginning of the first test time period and the actual temperature at the end of a last test time period. This means that a medium temperature gradient is determined over the total test time period, wherein the total test time period preferably begins with the beginning of the first of the test time periods and ends with the end of the last test time period.

Additionally or alternatively, it can be also provided that at least during at least one test time period, in particular permanently, an actual temperature gradient over time is determined, and when a maximum temperature is exceeded by the actual temperature gradient, the maximum temperature gradient is set to be equal to the actual temperature gradient. The maximum temperature gradient thus corresponds to the maximum actual temperature during the total test time period and/or to the actual temperature gradient occurring over time. In addition, the maximum temperature gradient tracks the actual temperature gradient, so that the maximum temperature gradient always corresponds to the largest actual temperature gradient.

According to another embodiment of the invention, a temperature flag is cleared at the beginning of the first test time period when the actual temperature becomes at least temporarily lower during at least one test time period. The temperature flag is set at the beginning of the first test time period and/or at the beginning of the total test time period. If it is determined during the test time period and/or during the total test time period that the actual temperature has temporarily fallen, the temperature flag will be cleared. This is preferably carried out when the current temperature has dropped by at least a minimum difference and/or with at least a minimum specific temperature gradient. Both the minimum difference and the temperature gradient are in this case above zero. For example, the minimum difference is at least 1K, 2K, 5K, 10K or 25 K.

The temperature flag can also be cleared when the actual temperature remains during at least one test time period and/or during the total test time period at least temporarily constant. In other words, the temperature flag is cleared when the previously mentioned actual temperature gradient over time is smaller than zero and/or equal to zero.

In another embodiment of the invention, an additional signal is generated when one or several of the following conditions are met:
A total temperature gradient is smaller than a first threshold value; and or
a maximum temperature gradient is smaller than a second threshold value; and or
a temperature flag is set; and/or
the number of the test time periods is greater than a test time period threshold value.

Reference is made to the previous embodiments with respect to the determination of the total temperature gradient, of the maximum temperature gradient, and of the temperature flag. It can be that the additional signal is provided already when only a single condition is met. However, several of them must be preferably met, in particular all of them.

By using the temperature flag, it is ascertained whether the actual temperature of the fluid has steadily increased during the test time period and/or during the total test time period, or at least remained constant. It is preferred when the temperature flag is set only when the actual temperature is constantly rising during the test time period and/or the total test time period. Checking the number of the test time period, which must be greater than the test time period threshold value, prevents that a determination regarding the functionality or a defect of the thermostatic valve is made as a result of a small number of measurement values of the actual amperage and the actual temperature. The test time period threshold is therefore selected in such a way so as to enable reliable testing. The first threshold value and the second threshold value are preferably set in such a way that a meaningful evaluation of the test signal can be obtained when the respective conditions have been satisfied.

According to another embodiment of the invention, the proper functioning of the thermostatic valve is recognized only when the test signal and the additional signal are generated. As was already mentioned above, proper functioning may be recognized already when only the test signal is generated. However, this has the disadvantage that the range conditions indicating a reliable test are not examined. These range conditions, however, are only present when the addition signal is present or generated. Accordingly, it is preferred when both the test signal and the additional signal are present, so that the proper functioning of the thermostatic valve is recognized.

According to another embodiment of the invention, a test mode is initiated when one or more of the following conditions are met:
The difference between the actual performance value and a performance value flag exceeds a certain limiting value; and/or
the actual temperature is at first below a first temperature threshold, and the threshold is reached only subsequently; and/or
the actual temperature is smaller than a second temperature threshold, which is greater than the first temperature threshold.

The operating performance value can correspond for example to the duration of the operating time of the fluid circuit, or to the mileage (kilometer) status of the motor vehicle. For initiating the test mode, it can be sufficient when only a single of the conditions applies. However, it is preferred when several of them are met, in particular all of them.

According to a preferred embodiment of the invention, the counter is incremented and/or a defect of the thermostatic valve is recognized when the additional signal is generated, while the test signal is not generated. As mentioned in the embodiment above, the additional signal indicates that the range conditions have been met for carrying out a reliable test. In this regard, a defect of the thermostatic valve may be present if the additional signal is generated, although the test signal is not generated. In this case, the defect of the thermostatic valve can be recognized for example immediately. Additionally or alternatively, the counter may be incremented.

According to a preferred embodiment of the invention, a defect of the thermostatic valve is recognized when the counter reaches or exceeds a certain limiting value. In such an embodiment, a defect of the thermostatic valve would not be recognized immediately when the additional signal is present, but the test signal is not present. Instead, the counter is incremented at first.

If the counter then does exceed the certain limiting value, it can then be assumed that the thermostatic valve is indeed defective. Accordingly, this is then recognized as a defect.

Additionally or alternatively, it can be provided that the operating performance flag is set at the actual operating performance when the additional signal and the test signal are generated, or when the count reaches or exceeds the limiting value. By setting the operating performance flag at the current performance value, the performance of a new test, which is to say a new initiation of the test time period and/or of the total test time period, is prevented until the difference between the current operating performance value and the operating performance flag exceeds again the certain limiting value. The testing of the thermostatic valve is then realized only after the defined performance, or a new limiting value, has been exceeded.

If the test signal is generated, but the additional signal is not generated, the range conditions for carrying out a reliable test are not present. Accordingly, the testing should be carried out again, for example during the next operating cycle, in particular a KL15 cycle. For this reason, the setting of the operating performance flag can be omitted, namely when the test signal is present, but the additional signal is not present.

The invention can be directed, additionally or alternatively, to a method for operating a fluid circuit of a motor vehicle, which is equipped with a main circuit, with a mechanical thermostatic valve, and provided with a secondary circuit connected to the main circuit, as well as to an electric fluid conveying device for conveying a fluid. The method is characterized in that when a value is below a local minimum amperage value during the test time period, the local minimum amperage is set to the actual amperage and the actual temperature of the fluid as well as the actual amperage are stored as the first test time period value pair, and when a local maximum amperage value is exceeded during the test time period, the local maximum amperage value is set to the actual amperage and the temperature of the fluid as well as the actual amperage are stored as the second test time period value pair. The method can thus be further configured or developed according to the description.

BRIEF DESCRIPTION OF THE DRAWINGS

The invention further also relates to a fluid circuit for a motor vehicle, in particular for carrying out the method according to the preceding embodiments, wherein the fluid circuit is equipped with a main circuit, wherein the fluid circuit is provided with a main circuit, and with a secondary circuit that is connected through a mechanical thermostatic valve to the main circuit, as well as with an electric fluid conveying device for conveying a fluid. At the same time, the fluid circuit is adapted to set the fluid conveying device to a certain test rotational speed in a test mode during a test time period, and to determine the actual amperage of the current required for the fluid conveying device, wherein when the actual temperature of the fluid is smaller than a switching temperature of the thermostatic valve, the actual amperage is stored as the first amperage, and when an actual temperature is greater than the second switching temperature, a second amperage value is stored, so that a proper function of the thermostatic valve is recognized when the second amperage value is greater than the first amperage value.

The advantages of such a configuration of the fluid circuit have already been pointed out.

Both the fluid circuit and the method can be further developed according to the preceding embodiments, so that a reference is hereby made to them.

The invention will be next explained in greater detail with reference to the embodiments illustrated in the figures, without limiting the invention. The figures show:

FIG. 2 a schematic representation of a method for operating a fluid circuit, an

DETAILED DESCRIPTION OF THE DRAWINGS

Figure 1:
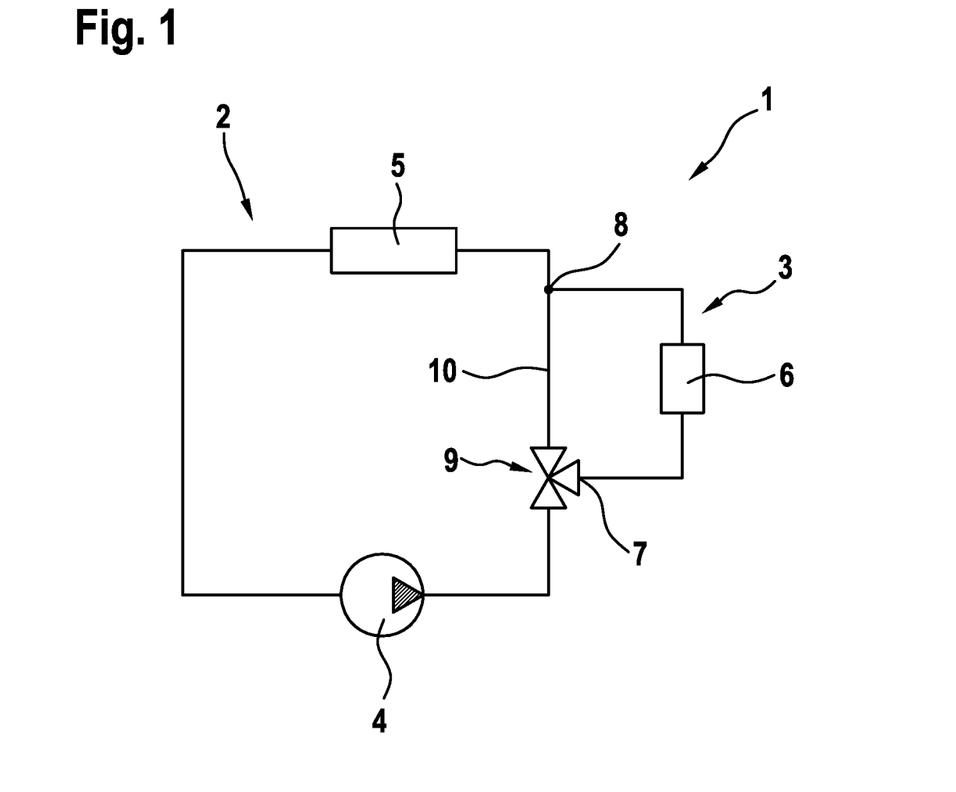
FIG. 1 a schematic representation of a fluid circuit.

FIG. 1 shows a schematic representation of a fluid circuit 1, which is employed for example for a motor vehicle. The fluid circuit is provided with a main circuit 2, as well as with a secondary circuit 3. In the main circuit is provided for example an electric fluid conveying device 4, in particular in the form of a pump. In addition, a device 5 can be present in the main circuit 2, which is impacted by a fluid that is present in the fluid circuit 1. The device 5 can be for example an adjusting device of an automatic transmission or the like. The fluid circuit 1 is in this case designed for example as a hydraulic circuit.

In the secondary circuit 3 is preferably arranged a heat exchanger 6, which is used for cooling of the fluid that is present in the fluid circuit 1. The secondary circuit 3 is connected to two opening positions 7 and 8 on the main circuit 2. At the opening position 7 is in this case provided a thermostatic valve 9, through which the secondary circuit 3 is connected to the main circuit 2. It goes without saying that the thermostatic valve 9 can be alternatively also present at the branch-off point 8.

The thermostatic valve 9 is designed as a mechanic thermostatic valve and it is equipped for this purpose for example with a mechanical actuator, not shown in the figure, which is provided in particular as a growing and expanding element. The thermostatic valve 9 is configured in such a way that the secondary circuit 3 is fully decoupled from the main circuit 2 at an actual temperature of the fluid that is lower than a switching temperature of the thermostatic valve. Accordingly, the fluid that is supplied by the fluid conveying device 4 is supplied without passing first through the side circuit 3. For example, a bypass line 10 is provided for this purpose between the branch-off points 7 and 8.

At an actual temperature of the fluid that is lower than the switching temperature, the thermostatic valve is in a first switching position. In the first switching position, the branch-off point 8 is fluidically connected through the bypass line 10 with the branch-off point 7, while the secondary circuit 3 is fully decoupled from the main circuit 2. On the other hand, if an actual temperature of the fluid corresponds to or exceeds the switching temperature, a second switching state of the thermostatic valve 9 is set, in which at least a portion of the fluid will flow through the secondary circuit 3 starting from the branch-off point 7, and thus will pass from branch-off point 7 to the branch-off point 8. It is preferred when all of the fluid that is conveyed by the fluid conveying device 4 flows through the secondary circuit 3. Accordingly, the thermostatic valve 9 is adjusted such that all of the fluid is supplied from the branch-off point 7 through the secondary circuit 3, and not through the bypass line 10, to the branch-off point 8.

Figure 2:
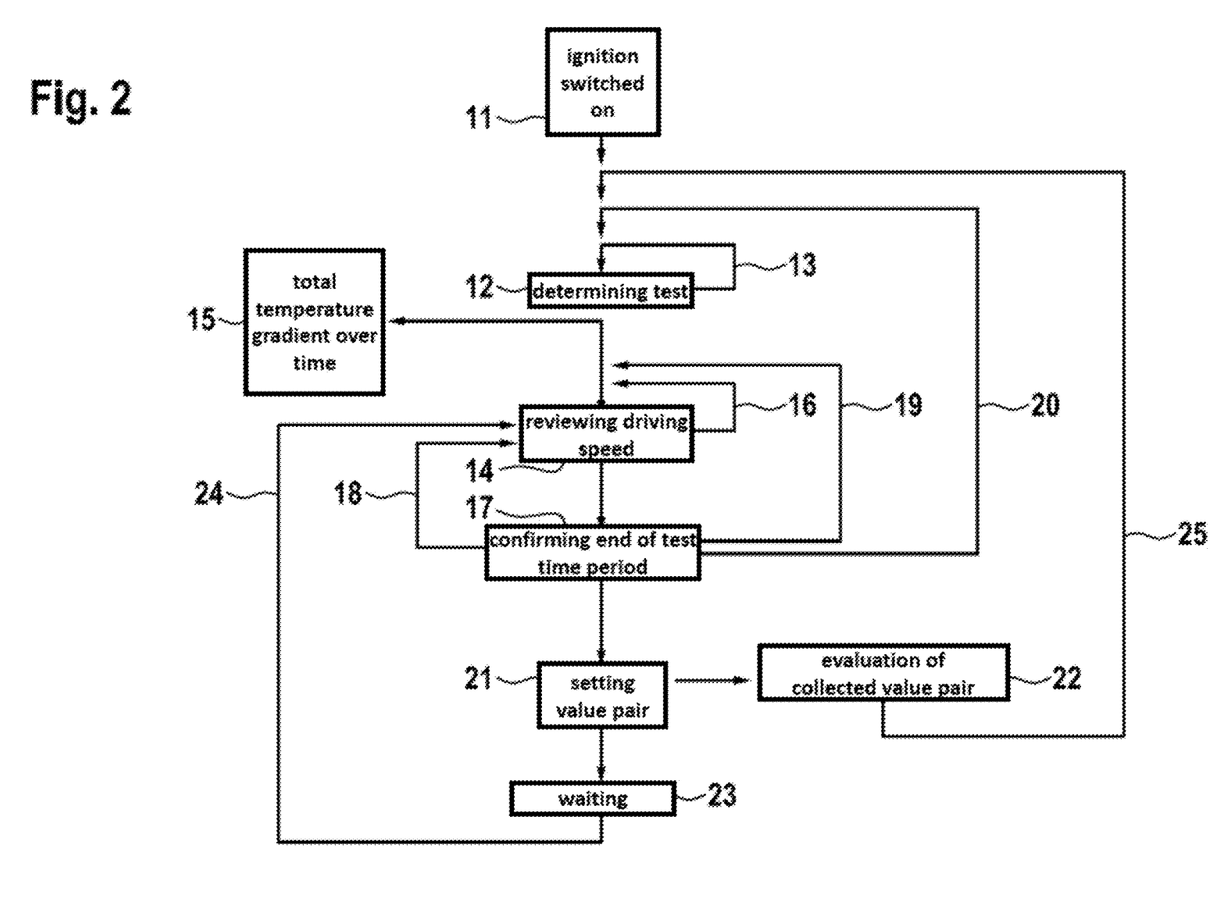

Referring now to FIG. 2, a method for operating the fluid circuit will be described, which makes it possible to perform a simple and reliable test of the functionality of the thermostatic valve 9. A first step 11 of the method is initiated for example as soon as ignition is switched on and a KL 15 cycle begins. After that, a check is made in step 12 to determine whether a test of the thermostatic valve 9 should be carried out. Such a test can be requested for example manually. Additionally or alternatively, a test can be carried out when the difference between an actual operational performance value and a determined operational flag is exceeded, and/or when the actual temperature is at first under a first temperature threshold, and then reaches or exceeds it, and/or when the actual temperature is lower than a second temperature threshold, which is higher than the first temperature threshold.

It is preferred when the process is branched along the path 13 to a new test in the step 12, when one or several of the conditions listed above are not met. On the other hand, if one of them, preferably several of them, or in particular all of the conditions are met, the process will proceed to a step 14 and a parallel step 15 is initiated. In the context of the step 15 it is provided that a total temperature gradient over time is determined, as well as a maximum temperature gradient. In addition, a temperature flag is set. This flag is then subsequently cleared when the actual temperature of the fluid is at least temporarily lower. Additionally, the temperature flag can be also cleared when the actual temperature remains at least temporarily constant.

Within the context of step 14 it is reviewed whether a driving speed of the motor vehicle exceeds a threshold speed value. A hysteresis value can be in this case added to the speed threshold value, for example of at least 5 km/h. If the condition is not met, than the motor vehicle is slower than the speed threshold value and the process will be branched back along the path 16 to step 14 and the test is performed again. On the other hand, if the condition is met, the fluid conveying device 4 will be set to a test rotational speed and the amperages stored in a first test time and in a second test time value pair are reset. For example, the amperage of the first test time period value pair is set to a very high value, and the amperage stored in the second test time period value pair is set to a very low value. Alternatively, the amperages of at least the first test time period value pair and of the second test time period value pair, are also set to the momentary actual amperage.

After that, the stop 17 is initiated. In this step it can be first confirmed whether the test time period must be ended prematurely. For this purpose, one or several of the following conditions must be met. A requested rotational speed is different from the test rotational speed; the actual amperage exceeds an amperage threshold value; an actual rotational speed of the fluid conveying device 4 deviates by at least a certain differential number of revolutions from the test rotational speed; a weakening of the actual rotational speed is determined; the difference between a local maximum amperage and a local minimum amperage exceeds a different threshold value; and/or a change of the local temperature is determined. If at least one of the conditions is applicable, the process is branched back along the path 18 to the step 14.

On the other hand, if the driving speed of the motor vehicle is below the driving speed threshold, the process can be set back along the path 19 to step 14. Additionally, the rotational speed may be also reduced, in particular set to zero. If the actual temperature exceeds during the step 17 a certain threshold value, the process can be branched back along the path 20 to the step 12.

A test time period is then carried out during the step 17. The fluid conveying device is adjusted during this step to a certain test rotational speed and the actual amperage of the current required for the fluid conveying device 4 is determined. When a local minimum amperage is below a certain value based on the actual amperage during the test time period, the local minimum amperage is set to the actual amperage and the actual temperature of the fluid is stored along with the actual amperage as the first test time period pair. Similarly, when the local maximum amperage is exceeded by the actual amperage during the test time period, the local maximum amperage is set to the actual amperage and the temperature of the fluid as well as the actual amperage are stored as the second test time period value pair.

This will be carried out at the end of the test time period, which is to say over a certain period of time. After that, the rotational speed can be reduced, in particular set to zero, in order to save energy. Immediately after the end of the test time period, the process is branched to the step 21. In this step, when an amperage stored in a first global value pair value pair is below a certain value based on the amperage stored in the first test time period value pair, the first global value pair is set to be equal to the first test time period value pair, and/or if the amperage stored in a second global value pair is exceeded based on the amperage stored in the first test time value pair, the second global value pair is set to be equal to the first test time period value pair. If the test time period that was carried out was the first of several test time periods, a starting value pair is also set that is equal to the first test time value pair.

After that, it is reviewed whether an evaluation should be initiated. This is the case when one or several of the following conditions are met: the amperage of the second global value pair is higher by a certain amperage than the amperage of the first global value pair; the amperage of the first test time period value pair is lower by a certain amperage difference than the amperage of the second global value pair, and/or the actual temperature of the fluid is higher than the temperature of the second global value pair; and/or the temperature of the second global value pair is higher than the temperature of the first global value pair. If this condition is applicable, the process is branched to the step 22. Otherwise, the step 23 is initiated, during which waiting is introduced for a certain period of time and after that, the process is branched back along the path 24 to the step 14. A further test time period can be also initiated in this case.

An evaluation of the collected value pairs is carried out in the step 22. At first, at the beginning of the evaluation, an evaluation value pair is set as being equal to the first test time period value pair of the immediately preceding test time period. After that, a test signal is generated when one or several of the following conditions apply: $t_S \le t_1 \le t_2 \le t_4$, wherein $t_S$ is the temperature of the starting value pair, $t_1$ is the temperature of the first global value pair, and $t_4$ is the temperature of the evaluation value pair; the difference between the amperage of the second global value par and the amperage of the first global value pair is greater than a certain global amperage difference, the difference between the temperature of the second global value pair and the temperature of the first global value pair is smaller than a certain global temperature difference; and/or the difference between the amperage of the starting value pair and the amperage of the first global value pair is smaller than a certain amperage difference.

In addition, an additional signal is generated when one or several of the following conditions are met: a total temperature gradient is smaller than a first threshold value; a maximum temperature gradient is smaller than a second threshold value; the temperature flag is set; and/or the number of the test time periods is higher than a test time period threshold value.

When both the test signal as well as the additional signal are generated, a proper function of the thermostat is recognized. In addition, the operating performance flag is set to the current operating performance value. Additionally, a counter can be reset. On the other hand, if not only the test signal, but also the additional signal is present, the counter is incremented. If the counter exceeds a certain limiting value or reaches this value, a defect of the thermostatic valve is recognized. In addition, the operating performance flag can be in this case set to the current operation performance value. If only the test signal is present, but the additional signal is not present, it can be assumed that there is no defect of the thermostatic valve 9; at the same time, however, sufficient range conditions for a reliable test are not provided. Therefore, the operating performance flag is not updated, so that a further test time period can be initiated in a timely manner. After the step 22, the process is branched along the path 25 back to the step 12.

Figure 3:
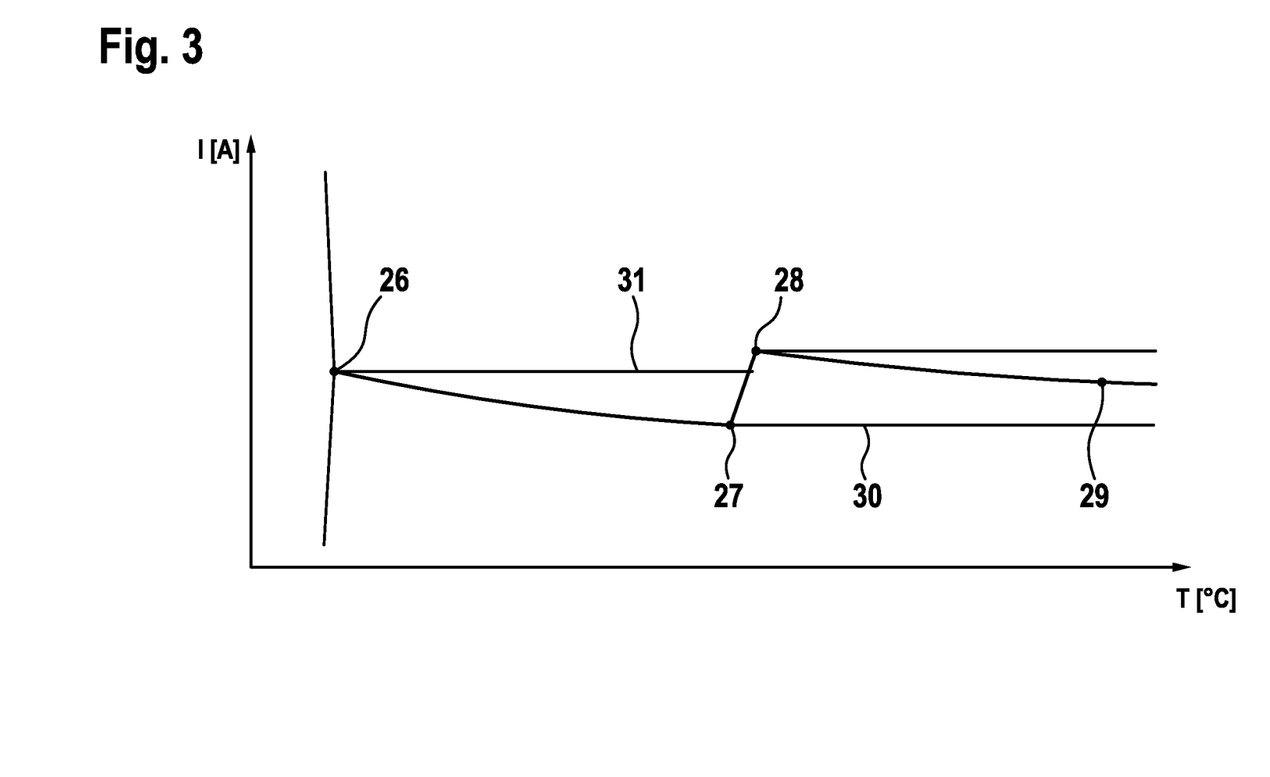
FIG. 3 a diagram in which several value pairs are indicated consisting of temperature and amperage.

FIG. 3 shows a diagram in which are plotted examples of different value pairs. The diagram shows in this case amperage I above amperage T, which are stored in the value pair. The starting value pair is plotted in point 26, the first global value pair in point 27, the second global value pair in point 28, and the evaluation value pair in point 29. Line 30 indicates amperages over temperature stored in the first global value pair, while line 31 represents amperages over the temperature stored in the second global value pair, or the course thereof.

It can be provided that the second global value pair is set to be equal to first global value pair when the temperature of the second global value pair is lower than the temperature of the first global value pair. In this case, it may happen that the line 31 will coincide up to 27 with the line 30 indicated in the graph and the course of the direction of the rising temperature illustrated here starts only after that, which is to say in particular from point 28.

Overall, the change in the actual amperage is determined by using the method at the relevant point in time at which the actual temperature of the fluid reaches or exceeds the switching temperature of the thermostatic valve 9. In that regard, the actual amperage is stored as the first value (preferably corresponding to the temperature of the first global value pair) with an actual temperature of the fluid that is lower than the switching temperature, and with an actual temperature that is higher than the switching temperature, a second value is stored (preferably corresponding to the temperature of the second global value pair). The proper function of the thermostatic valve can thus be generally recognized when the amperage of the second value pair is higher than the amperage of the first value pair. This can be seen particularly clearly in the diagram on the basis of points 27 and 28.

The invention claimed is:

1. A method for operating a fluid circuit of a motor vehicle, comprising:
    main circuit, and with a secondary circuit that is connected through a thermostatic valve to the main circuit, and with an electric fluid conveying device for conveying a fluid, wherein during a test time period in a test operating mode, the fluid conveying device is adjusted to a certain rotational speed and an actual amperage required by the fluid conveying device is determined, wherein with an actual temperature of the fluid that is lower than a switching temperature of the thermostatic valve, the actual amperage is stored as a first amperage value, and with an actual temperature that is higher than the switching temperature, a second amperage value is stored, wherein a proper function of the thermostatic valve is recognized when the second amperage value is greater than the first amperage value.

2. The method according to claim 1, wherein when the actual amperage is lower than a local minimum amperage during the test time period, the local minimum amperage is set to the actual amperage, and the actual temperature of the fluid as well as the actual amperage are stored as a first test time period value pair, and when a local maximum amperage is exceeded by the actual amperage during the test time period, the local maximum amperage is set to the actual amperage, and the actual temperature of the fluid as well as the actual amperage are stored as a second test time period value pair.

3. The method according to claim 1, wherein several test time periods are initiated during a total test time period, wherein at the end of the first of the test time period, a starting value pair is set to be equal to a first test time value pair.

4. The method according to claim 1, wherein when after the test time period, an amperage stored in the first test time value pair is below an amperage stored in a first global value pair, the first global value pair is set to be equal to the first test time value pair, and that when after the test time period, an amperage stored in the second global pair is exceeded by the amperage stored in the first test time period value pair, the second global value pair is set to be equal to the first test time value pair.

5. The method according to claim 1, wherein an evaluation is initiated after the test time period, at least one of the following conditions are applicable:
    the amperage of a second global value pair is higher by a certain amperage difference than the amperage of the first global value pair;
    the amperage of the first test time period value pair is lower by a certain second amperage difference than the amperage of the second global value pair;
    the actual temperature of the fluid is higher than the temperature of the second global pair; and
    the temperature of the second global value pair is higher that then temperature of the first global value pair.

6. Method according to claim 1, wherein at the beginning of the evaluation, an evaluation value pair is set as equal to the first test time period value pair from the immediately preceding test time period.

7. Method according to claim 1, wherein a test signal is generated when one or several of the following conditions apply:
    $t_s \leq t_1 \leq t_2 \leq t_4$, wherein $t_s$ is the temperature of the starting value pair, $t_1$ is the temperature of the first test global time period value pair, $t_2$ is the temperature of the second test time period value pair, and $t_4$ is the temperature of the evaluation time period value pair; and
    the difference between the amperage of a second global value pair and the amperage of a first global value pair is greater than a certain global amperage difference; and the difference between the temperature of the second global value pair and the temperature of the first global value pair is smaller than a certain global temperature difference; and the difference between the amperage of the starting value pair and the amperage of the first global value pair is smaller than a certain starting amperage difference.

8. Method according to claim 1, wherein an additional signal is generated when at least one of the following conditions are met:
 a total temperature gradient is smaller than a first threshold value;
 a maximum temperature gradient is smaller than a second threshold value;
 a temperature flag is set; and
 the number of the test time periods is greater than a test time period threshold value.

9. Method according to claim 1, wherein a proper function of the thermostatic valve is recognized only when a test signal and an additional signal are generated.

10. A fluid circuit for a motor vehicle, in particular for carrying out the method according to claim 1, wherein the fluid circuit is provided with a main circuit and with a secondary circuit, which is connected to the main circuit via a mechanical thermostatic valve, as well as with an electric fluid conveying device for conveying a fluid, wherein the fluid circuit is adapted so that in an operating mode, during a test time period, the rotational speed of the fluid conveying device is adjusted to a certain rotational speed and an amperage of the current that is required for the fluid conveying device is determined, wherein when an actual temperature of the fluid is lower than a switching temperature of the thermostatic valve, an actual amperage is stored as the first amperage value, and when the actual temperature is higher than the switching temperature, it will be stored as a second amperage value, wherein a proper function of the thermostatic valve is recognized when the second amperage value is higher than the first amperage value.

* * * * *